US007369248B2

(12) United States Patent
Cheng

(10) Patent No.: US 7,369,248 B2
(45) Date of Patent: May 6, 2008

(54) DEVICE FOR MEASURING AN OPTICAL PATH LENGTH DIFFERENCE

(75) Inventor: Lun Kai Cheng, Krimpen a/d IJssel (NL)

(73) Assignee: Nederlandse Organisatie Voor-Toegepast Natuurwetenschappelijk Onderzoek Tno, Delft (NL)

( * ) Notice: Subject to any disclaimer, the term of this patent is extended or adjusted under 35 U.S.C. 154(b) by 161 days.

(21) Appl. No.: 10/530,916

(22) PCT Filed: Oct. 8, 2003

(86) PCT No.: PCT/NL03/00683

§ 371 (c)(1),
(2), (4) Date: Apr. 8, 2005

(87) PCT Pub. No.: WO2004/033987

PCT Pub. Date: Apr. 22, 2004

(65) Prior Publication Data

US 2005/0275846 A1    Dec. 15, 2005

(30) Foreign Application Priority Data

Oct. 8, 2002    (NL) .................................... 1021600

(51) Int. Cl.
*G01B 9/02*    (2006.01)
(52) U.S. Cl. .................................................... 356/477
(58) Field of Classification Search ............... 356/466, 356/477, 479, 482, 497; 250/227.19, 227.27
See application file for complete search history.

(56) References Cited

U.S. PATENT DOCUMENTS

| 4,728,191 | A | * | 3/1988 | Zarobila | .................. 356/480 |
| 4,818,109 | A |   | 4/1989 | Hutchings et al. | |
| 4,923,268 | A |   | 5/1990 | Xu | |
| 5,777,737 | A | * | 7/1998 | Priest | ........................ 356/466 |
| 6,886,404 | B2 | * | 5/2005 | Digonnet et al. | ........ 73/514.27 |

FOREIGN PATENT DOCUMENTS

WO    WO 97/21981    6/1997

OTHER PUBLICATIONS

R. Fuest; Integrated Optical Michelson-Interferometer With Quadrature Phase Demodulation in Glass for Displacement Measuring; 8008 TM Technisches Messen, 58 Apr. 1991, No. 4, Munchen, DE.
Fuest, R.; "Integrated optical Michelson-interferometer with quadrature phase demodulation in glass for displacement measuring"; Apr. 1, 1991; vol. 58, No. 4, pp. 152-157.

* cited by examiner

*Primary Examiner*—Michael A. Lyons

(57) ABSTRACT

In measuring an optical path length difference, light from a light source is guided through a first and a second path. A three-way coupler combines light from the first and the second path in at least three combination, with at least three mutually different added relative phase displacements. A detector measures interference intensities of the at least three combinations. From the intensities, a calculation unit determines a phase difference between the light from the first and second path while eliminating an effect of a contrast between the light from the first and second path.

7 Claims, 1 Drawing Sheet

DEVICE FOR MEASURING AN OPTICAL PATH LENGTH DIFFERENCE

FIELD OF THE INVENTION

Figure 1:
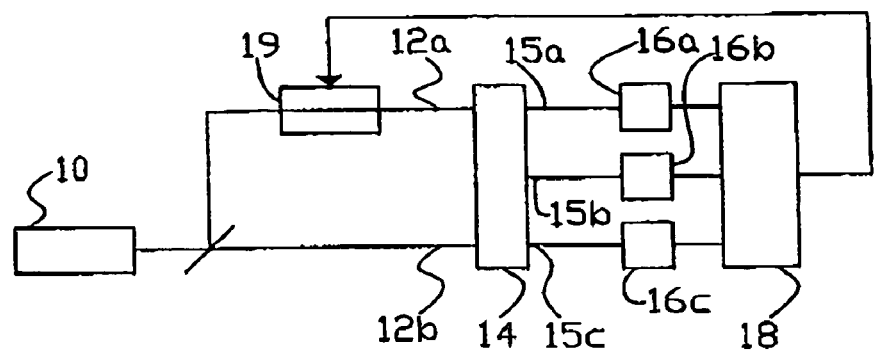

The invention relates to an apparatus for measuring an optical path length difference, to a method for determining an optical path length difference and to a computer program product for use in such a method.

BACKGROUND OF THE INVENTION

Optical interference measurements make it possible to measure path length differences between different light paths with great accuracy. Here, light components which have first been guided through different paths are combined. The intensity of the combined light depends on the relative phase of the components which is caused by the path length difference. Thus, by measuring this intensity, information is obtained about the path length difference.

Such measurements are often used in control systems in which the path length difference between the different paths has to be controlled out. When there is no path length difference, the intensity of a combination of the components in which the polarity of one of the components is inverted prior to combining is minimal. This can be used to control out the path length difference. A method of accurately determining the minimum is to use a measuring signal which "crosses zero" when the path length difference is zero (i.e. the measuring signal is negative for a path length difference in one direction and is positive for a path length difference in the opposite direction). Such a measuring signal can be made by slightly modulating the path length difference and synchronously measuring the in-phase component of the resulting modulation in the intensity of the combined signal. This in-phase component crosses zero at the minimum of the intensity, i.e. when the path length difference is zero.

However, in practice, a modulation of the path length difference is often undesired. For that reason, the measuring signal crossing zero, without modulation, is sometimes made by measuring the intensity of two combinations of the components, in which the components are combined directly and after one of the components has been phase-displaced by 180 degrees respectively. The ratio between the difference and the sum of the intensities measured in this manner crosses zero when the path length difference has been controlled out. By calculating this ratio, a measuring signal is obtained by means of which the path length difference can be controlled to zero without modulation being necessary.

The measuring signal obtained in this manner is, inter alia, proportional to the amplitude ratio of the light components which are combined. This amplitude ratio has no effect on the path length difference when it is controlled out. However, the amplitude ratio does play a role when the path length difference is to be controlled to a fixed value which is not equal to zero. Also, the amplitude ratio can affect the gain of a control loop by means of which the path length difference is controlled. Unfortunately, the amplitude ratio of the light components is not always constant. Therefore, it is often necessary to measure the amplitude ratio separately to compensate for its effect. However, this generally requires complicated additional measurements which, moreover, make the apparatus more susceptible to fluctuations in the sensitivity.

SUMMARY OF THE INVENTION

It is one of the objects of the invention to provide an apparatus for measuring an optical path length difference in which the effect of the amplitude ratio of the light components on the measurement of the path length difference is eliminated in a simple manner.

The invention provides an apparatus according to claim 1. By the invention, the effect of the amplitude ratio on the phase measurement is eliminated with three solar intensity measurements. Thus, the elimination can be realized robustly and simply.

Preferably, the light from the first and second path is combined to three combinations in which the relative phases mutually differ virtually one hundred and twenty degrees. Thus, a maximum sensitivity is obtained.

As a coupler, preferably a wave guide coupler is used. Thus, the coupler can be realized in a simple manner.

BRIRF DESCRIPTION OF THE DRAWINGS

This and other objects and advantageous aspects of the apparatus and method according to the invention will be described in more detail with reference to the following Figures.

Figure 2A:
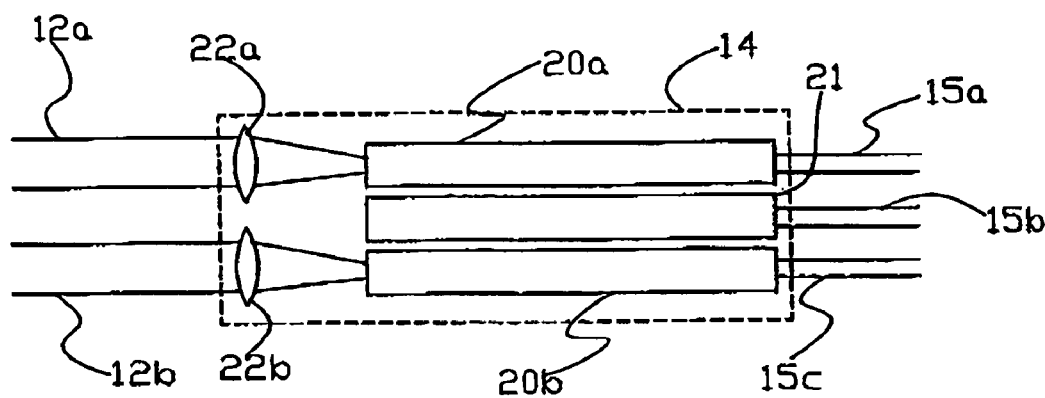

FIG. 1 shows an apparatus for measuring a path length difference;

FIGS. 2a,b show a three-way coupler.

DETAILED DESCIPTION OF THE INVENTION

FIG. 1 shows an apparatus for measuring a path length difference. The apparatus comprises a light source 10, a coupler 14, detectors 16a-c, a oalculation unit 18 and a path length controller 19. Light from light source 10 is guided to a coupler 14 via two paths 12a,b. Light paths 12a,b each have their own path length, while the path lengths of the different light paths 12a,b can differ. Path length controller 19 is capable of adjusting the path length of one of the light paths under control. Further details of light paths 12a,b are not necessary to understand the invention and have therefore been omitted. Coupler 14 has three outputs which are each coupled to a respective detector 16a-c. Detectors 16a-c have outputs which are coupled to calculation unit 18. Calculation unit 18 has an output which is coupled to path length controller 19.

Figure 2B:
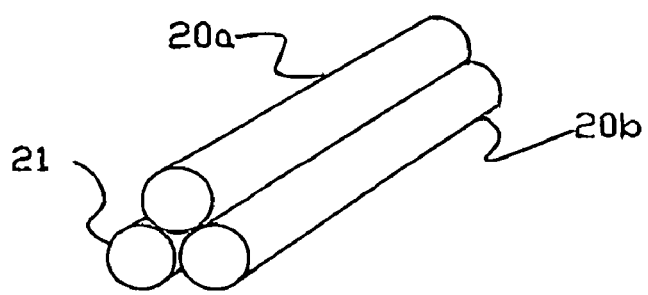

FIG. 2a shows an example of a three-way coupler 14. This embodiment of three-way coupler 14 contains three optical wave guides 20a,b, 21 (for instance glass fibers) and incoupling lenses 22a,b. Light from the paths 12a,b is imaged on the inputs of two of the optical wave guides 20a,b by incoupling lenses 22a,b. The three optical wave guides 20a,b, 21 are set apart a short distance over at least a part of their lengths (this part is shown as a parallel ruing part). Although, the three wave guides 20a,b, 21 are shown diagrammatically in a row in FIG. 2a, wave guides 20a,b, 21 abut each other in pairs as shown in FIG. 2b.

The short distance between the wave guides 20a,b, 21 results in pairwise optical couplings, so that light waves partly couple from one wave guide to the other. Thus, light coupled in on one, wave guide 20a,b, 80 distributed over the wave guides, is coupled out on outputs 15a-c of the wave guides 20a,b, 21. There are mutual phase differences between the phases with which the light of a particular input is coupled out on different outputs 15a, depending on whether the respective output 15a-c is coupled directly to the particular input via the wave guide 20a,b or via a coupling between'the wave guides 20a,b.

Because light is coupled in on two of the wave guides 20a,b, the light on outputs forms combinations of the light waves coupled in on the inputs 20a,b, with the light, in each combination, being combined with different added phase differences. For instance, the phase displacement θ is the same for the coupling between each pair of wave guides 20a,b, 21 (preferably one hundred and twenty degrees). In this example, the added phase difference between first light from first incoupling leas 22a and second light from second incoupling lens 22b will be −θ on the output 15a where the first light arrives directly via a wave guide 20a and the second light arrives via a coupling, while the added phase difference is θ on the output 15c where the first light arrives via a coupling and the second light directly via a wave guide 20b. Further, the added phase difference will be zero on the output 15b of the wave guide 21 in which both the first and the second light arrive via a coupling.

It is self-evident that, also at the outputs 16a-c, lenses etc. can be provided to couple the exiting light to detectors 16a-c, but these are not shown for reasons of clarity.

In operation, light from light source 10 is guided via two different light paths 12a,b to inputs of three-way coupler 14. The three-way coupler combines the light from the two light paths 12a,b in three different ways, whereby the light from the different light paths 12a,b is each time combined with a different relative phase: for instance on a first output 15a in phase, on a second output 15b with the light from the fret light path 12a preferably leading the light from the second light path by one hundred and twenty degrees, and on a third output 15c with the light from the first light path 12a preferably lagging one hundred and twenty degrees behind the light from the second light path. The intensity of the combined light issuing from the different outputs 15a-c is detected by detectors 16a-c.

Detectors 16a pass detection signals to calculation unit 18. The detection signals represent the detected intensities of the different combinations, for instance in the form of analogous electrical signals or in the form of digital representations of the measured intensity.

Calculation unit 18 calculates the phase difference between the light from the different light paths 12a,b from the measured intensities. In the example where three-way coupler 14 combines the light from light paths 12a,b with relative phases of zero and plus and Gus one hundred and twenty degrees, the following applies to the intensities of the different combinations:

$$I0 = A(1+V \cos(360 * D/\lambda))$$

$$I+ = A(1+V \cos(120 + 360 * D/\lambda))$$

$$I- = A(1+V \cos(-120 + 360 * D/1))$$

Here, I0, I+ and I− are the intensities of the combinations of light from light paths 12a,b issuing on outputs 15a-c, where I0 represents the intensity of the combination with relative phase 0, and I+ and I− represent the combinations with phases leading and lagging 120 degrees. D is the path length difference between light paths 12a,b, and λ is the wavelength of the light used. A is a function of the average amplitude of the light from the two light paths 12a,b and V is the contrast of the interference intensities. The contrast expresses, for instance, the difference between the amplitudes and/or polarization differences of the light from the two light paths 12a,b.

From the signals of detectors, calculation unit 18 calculates the path length difference D between light paths 12a,b, for instance according to the relation $$D = \lambda acrtg([\sqrt{3}] * [I+ - I-]/[2I0 - I+ - I-])/360$$

(The factor 360 assumes that arctg function (inverse of the tangent function) gives its result in degrees. In the case that radians are used, this factor becomes $2\pi$).

Thus, the effect of the average amplitude A and the difference between the amplitudes V of the light from the two light paths is eliminated. On the basis of the thus calculated path length difference D, calculation unit 18 determines a control difference with a desired path length difference and supplies a feedback signal to path length controller 19 which is proportional to the control difference. Thus, the apparatus controls the path length difference between the two light paths 12a,b to the desired value.

The calculation of the path length difference D according to the above formula is not unambiguous: the same measurement of I0, I+, I− can also correspond to a path length difference which differs a whole number of wavelengths λ/2 from the given solution. In the foregoing, it was assumed that the path length difference is originally between +/− a quarter of the wavelength λ of the light used. If this cannot be assumed, then, in the above-described manner, a calculation is also made on measurements with light of a second wavelength λ' which differs from λ. By combining the two calculations, it is possible to determine what multiple of λ has to be added to the calculated D to come to virtually the same D for the two wavelengths. Thus, the value of D can be unambiguously determined within a wider range than with measurement on a single wavelength.

Although the invention has been described on the basis of combinations of the light from light paths 12a,b in which the relative phase of the combined light is, each time, one hundred and twenty degrees apart, different combinations of relative phases $\phi_1$, $\phi_2$, $\phi_3$ can of course also be used. The intensities 10, 11, 12 measured by detectors 16a-c then meet $$I0 = A(1+V \cos(\phi_1 + 360 * D/\lambda))$$

$$I1 = A(1+V \cos(\phi_2 + 360 * D/\lambda))$$

$$I2 = A(1+V \cos(\phi_3 + 360 * D/\lambda))$$

For given $\phi_1$, $\phi_2$, $\phi_3$, by means of elementary algebraic techniques, a formula for the path length difference D can again be derived from this as a function of I0, I1, I2, from which the effect of A and V has been eliminated. With it, the calculation unit can again calculate the path length difference D from the measured intensities I0, I1, I2. Without deviating from the invention, the calculation, instead of being done with an explicit expression for D, can also be done by numerically solving D from the above equations, for instance by means of the Newton-Raphson algorithm known per se.

Although the invention has been described on the basis of an apparatus with a control system for adjusting the path length difference D, it will be clear that the determination of the path length difference D according to the invention can also be used in other circumstances, for instance when only a measurement of the path length difference D is needed, for instance for a later correction calculation of other measurements done on the path length difference.

Calculation unit 18 is preferably designed as a digital computer provided with a program to read out the measured intensities and to calculate D from the measurements of the intensities in the above-described maker. However, without deviating from the invention, use can also be made of special hardware which performs the calculation described, either with digital or with analog signals.

The invention claimed is:

1. An apparatus for measuring an optical path length difference, which apparatus is provided with
   optical elements to guide light from a light source through a first and a second path;

an at least three-way coupler to combine light from the first path and the second paths with each other in at least three combinations with at least three mutually different added relative phase displacements;

a detector arranged to measure interference intensities of the at least three combinations; and a calculation unit arranged to calculate, from the measured intensities, a phase difference between the light from the first and second paths, wherein the calculation unit calculates the phase difference using a mathematical relation which includes the measured intensities and while eliminating an effect of a contrast between the light from the first and second paths.

2. An apparatus for measuring an optical path length difference comprising:

optical elements to guide light from a light source through a first path and a second path;

an at least three-way coupler to combine light from the first and the second paths with each other in at least three combinations with at least three mutually different added relative phase shifts $\phi_1$, $\phi_2$, $\phi_3$;

a detector arranged to measure interference intensities I0, I1, I2 of the respective at least three combinations; and a calculation unit arranged to determine, from the intensities, a phase difference between the light from the first and second paths while eliminating an effect of a contrast between the light from the first and second paths, wherein $$I0 = A(1+V\cos(\phi_1 + 360*D/\lambda))$$

$$I1 = A(1+V\cos(\phi_2 + 360*D/\lambda))$$

$$I2 = A(1+V\cos(\phi_3 + 360*D/\lambda)),$$

where V represents the contrast, D a path length difference between the first and second paths which causes the phase difference, $\lambda$ a wavelength of the light used and A a function of the average amplitude of the light from the first and second paths.

3. An apparatus according to claim 1, wherein the at least three-way coupler combines the light from the first and second paths with each other with three different added relative phase displacements, which pairwise differ virtually one hundred and twenty degrees.

4. An apparatus according to claim 1, wherein the at least three-way coupler comprises three mutually coupled wave guides.

5. An apparatus according to claim 1, provided with a path length controller in at least one of the first and second paths, wherein the calculation unit is coupled to a drive input of the path length controller, and wherein the path length controller controls the path length difference between the first and second paths based on the calculated phase difference.

6. A method for measuring an optical path length difference, which method comprises the steps of:

guiding light from a light source through a first and a second path;

combining light from the first and the second path in at least three combinations with at least three mutually different added relative phase displacements;

measuring interference intensities of the at least three combinations;

calculating a phase difference between the light from the first and second paths using a mathematical relation which includes the measured intensities and while eliminating an effect of a contrast between the light from the first and second paths; and supplying the phase difference to a control system coupled to at least one of the first and second paths.

7. A computer program product with instructions to have a computer perform the following steps:

sampling interference intensities of at least three combinations of light from a first and second light paths, wherein the light in the three combinations is combined with at least three mutually different added relative phase displacements;

calculating a phase difference between the light from the first and the second paths using a mathematical relation which includes the sampled intensities and while eliminating an effect of a contrast between the light from the first and second paths; and supplying the phase difference to a control system coupled to at least one of the first and second paths.

* * * * *